United States Patent
Reddy A V et al.

(10) Patent No.: US 11,093,341 B1
(45) Date of Patent: Aug. 17, 2021

(54) SYSTEMS AND METHODS OF DATA AUTO-TIERING USING RELATIVIZED DISCREPANCY

(71) Applicant: EMC IP Holding Company LLC, Hopkinton, MA (US)

(72) Inventors: Mahesh Reddy A V, Bangalore (IN); Pradeep Viveki, Bangalore (IN); Mahantesh Ambaljeri, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 39 days.

(21) Appl. No.: 16/800,934

(22) Filed: Feb. 25, 2020

(51) Int. Cl.
*G06F 11/14* (2006.01)
*G06F 3/06* (2006.01)

(52) U.S. Cl.
CPC .......... *G06F 11/1451* (2013.01); *G06F 3/067* (2013.01); *G06F 3/0619* (2013.01); *G06F 3/0653* (2013.01); *G06F 11/1464* (2013.01); *G06F 11/1469* (2013.01)

(58) Field of Classification Search
CPC ............. G06F 11/1451; G06F 11/1464; G06F 11/1469; G06F 3/0619; G06F 3/0653; G06F 3/067

USPC ......................................................... 711/162
See application file for complete search history.

(56) References Cited

U.S. PATENT DOCUMENTS

| | | | | |
|---|---|---|---|---|
| 9,513,968 | B1* | 12/2016 | Fiske | G06F 3/0685 |
| 2007/0118344 | A1* | 5/2007 | Bolt | G05B 23/0254 703/2 |
| 2013/0262368 | A1* | 10/2013 | Wolff | G06K 9/00496 706/52 |
| 2015/0350100 | A1* | 12/2015 | Biderman | H04L 65/607 709/219 |
| 2016/0041776 | A1* | 2/2016 | Inoue | G06F 3/0689 711/114 |
| 2016/0094401 | A1* | 3/2016 | Anwar | G06F 11/3006 709/223 |
| 2020/0042228 | A1* | 2/2020 | Roberts | G06F 3/0683 |
| 2020/0160170 | A1* | 5/2020 | Kursun | G06K 9/6262 |
| 2020/0267062 | A1* | 8/2020 | Ting | H04L 43/024 |

* cited by examiner

*Primary Examiner* — Than Nguyen
(74) *Attorney, Agent, or Firm* — Womble Bond Dickinson (US) LLP

(57) ABSTRACT

Methods and systems for data auto-tiering are disclosed. According to some embodiments, the method receives a multiplicity of data streams. For each data stream, the method detects a data change within the data stream. The method further determines a magnitude of the data change. The method further assigns a tier level to the data stream based on the magnitude of the data change.

20 Claims, 5 Drawing Sheets

```
For i = 1,....k do
    c₀ ← 0
    Window₁,ᵢ ← first m₁,ᵢ points from time c₀
    Window₂,ᵢ ← first m₂,ᵢ points in stream
End For
While not at end of stream do
    For i = 1,...k do
        Slide Window₂,ᵢ by 1 point
        If d(Window₁,ᵢ,Window₂,ᵢ) > αᵢ then
            c₀ ← current time
            Report change at time c₀
            Clear all windows and GOTO step1
        End If
    End For
End While
```

| Tier | Magnitude of Data Change |
|---|---|
| Lowest | Between 0 and $0.5\alpha_i$ |
| Medium | Greater than $0.5\alpha_i$ but less than $0.75\alpha_i$ |
| Highest | Greater than $0.75\alpha_i$ |

FIG. 4

SYSTEMS AND METHODS OF DATA AUTO-TIERING USING RELATIVIZED DISCREPANCY

FIELD OF THE INVENTION

Embodiments of the present invention relate generally to data storage systems. More particularly, embodiments of the invention relate to data auto-tiering using relativized discrepancy.

BACKGROUND

Achieving an effective backup schedule that depends on data criticality has been a significantly intriguing topic in modern data protection world. As a backup admin, there is a need to achieve effectiveness in utilizing available data protection products. Distinct types of data would be assigned to respective backup policies that would have respective resources allocated, such as a schedule, device, pool reservations, etc. Usually, these parameters are admin-defined and estimated based on the overall usage of an entity for which data is to be protected. However, user estimates are not always effective because a source entity can have critical and non-critical data items that are being allocated with the same amount of resources.

Moreover, the backup admin would have multiple sources scheduled for FULL and INCREMENTAL backups at different schedules through distinct backup policies. This is an ineffective way of allocating resources in terms of backups windows and resource allocation.

Unfortunately, with conventional models of associating clients with a policy having constant attributes and irrespective of the nature of data per instant time, blocking of the resources leads to an ineffective way of utilizing a data protection application.

BRIEF DESCRIPTION OF THE DRAWINGS

Embodiments of the invention are illustrated by way of example and not limitation in the figures of the accompanying drawings in which like references indicate similar elements.

FIG. 3 is a diagram showing pseudo-code of a sliding window algorithm according to one embodiment.

FIG. 4 is a table illustrating an example of data tier classification according to one embodiment.

DETAILED DESCRIPTION

Figure 1:
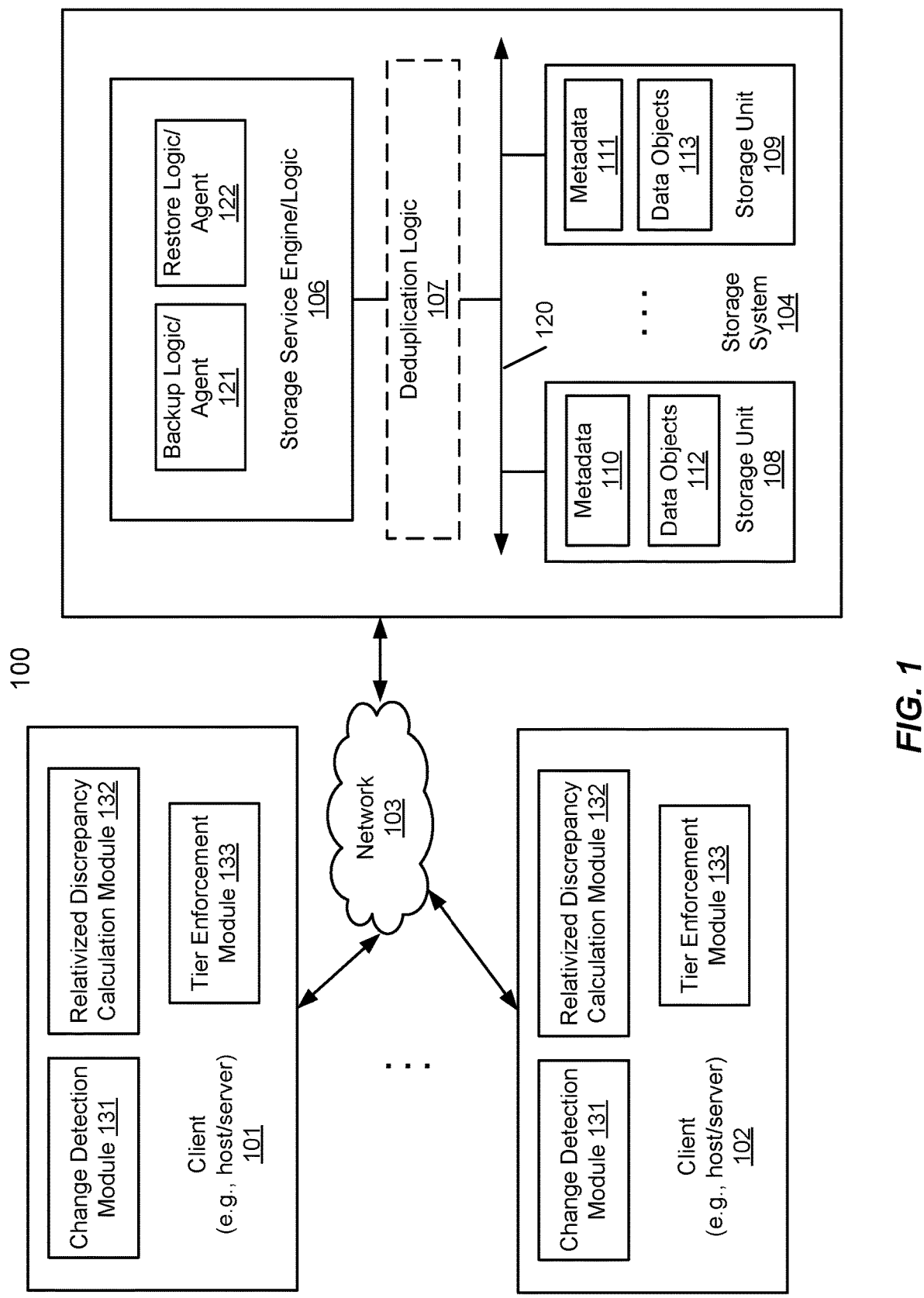
FIG. 1 is a block diagram illustrating a storage system according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Many application hosts are part of some backup policies that are scheduled to run in a predefined manner. Among the hosts, some may have high input/output (I/O) and some may have less I/O. Being in the same backup, they are scheduled to run at a specified time. The data that is backed up may be large for few hosts and very small for few other hosts. This kind of pattern is common across all policies. That is, few hosts may have active I/O at all time, while a few hosts may not have active I/O for most of the time. Thus, if all of the hosts having very small data change will be part of a backup, it would consume network bandwidth (e.g., CPU cycles). Slightly larger backup windows for hosts having less data change may still be acceptable. However, by dynamically reducing the backup window for hosts having frequent data change, it would help achieve better application consistency. This would be the case with respect to all the policies, where few hosts have active I/O and few comparatively less.

Embodiments of the disclosure relate to an auto-tiering solution that would classify data into tiers with dynamic and distributed attributes to achieve effectiveness in utilizing a data protection application. The dynamic auto-tiering of the data may be performed in accordance with the criticality of the data and resource allocations to the data accordingly. That is, the embodiments of the disclosure provide a dynamic way of tiering the data across different tiers with different backup windows and resources allocated to it. In general, the goal of a backup admin is to achieve more frequent backups for critical changes and less frequent backups for smaller data changes in terms of its criticality to ensure lower performance penalty on hosts, as well as better bandwidth and more frequency of critical backups, thereby resulting in a better deduplication.

Accordingly, described herein are method and systems that utilizes relativized discrepancy to achieve auto-tiering of the data from different sources. In some embodiments, the solution would initially analyze the content of the sources, consider a tag on it, and note the size and data change rate. In consecutive stages, the methods and systems may start to weight each of the content and start calculating relativized discrepancy parameters to get a final resultant that is used to dynamically group that particular portion of data to a respective tier for an effective backup. The solution may also provide a recommendation for allowing the backup admin to choose if the recommended tiering has to be enforced or overridden.

According to one aspect, a method of data auto-tiering is described. The method receives a multiplicity of data streams. For each data stream, the method detects a data change within the data stream. The method further determines a magnitude of the data change. The method further assigns a tier level to the data stream based on the magnitude of the data change.

In one embodiment, to detect the data change within the data stream, the method uses a first sliding window on a data point where a last data change was detected, and uses a second sliding window that slides a step forward every time there is new data in the data stream. In one embodiment, to determine the magnitude of the data change, the method evaluates a supremum based on a first probabilistic distribution associated with the first sliding window and a second probabilistic distribution associated with the second sliding window. The assigned tier level may be a lowest tier level representing minimum bandwidth and storage, a medium tier level representing optimum bandwidth and storage, or a highest tier level representing maximum bandwidth and storage. The magnitude of the data change may be a factor of a predetermined value (e.g., '1'). The factor may be between 0 and 0.5, greater than 0.5 but less than 0.75, or greater than 0.75. In one embodiment, the detection of the data change, the determination of the magnitude of the data change, and the assignment of the tier level to the data stream are run in parallel for each of the data streams.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

With continued referenced to FIG. 1, each of clients 101-102 may include a change detection module 131, a relativized discrepancy calculation module 132, and a tier enforcement module 133. Change detection module 131 receive data on multiple data streams and define probabilistic distributions from the data streams and their corresponding data changes probabilities. In one embodiment, module 131 may include a number of sliding windows. The sliding windows may include at least one static sliding window and at least one sliding window sliding on multiple data streams to define probabilistic distributions from different streams (e.g., two different streams) and their corresponding data changes probability. The probability value and the sliding window algorithm may run in parallel at a time for multiple data streams. The probabilistic distributions are provided to relativized discrepancy calculation module 132 that analyzes the magnitude of the data changes as a function of available probabilities. Once the magnitude of the data changes has been detected or determined, the final values may be fetched by tier enforcement module 133 to route the results to storage system 104 to dynamically change the tier of certain data streams in a cumulative form. The final resultant may be in the form of a recommendation that a current set of data streams from a source (e.g., clients 101-102) must be grouped to a particular tier. A user may choose to allow the recommended change or retained a previously defined tier. Accordingly, this algorithm is improved over a period of time, rather than the initial instant of time due to relative changes that occur over a period of time. That is, the smaller the values considered in a distance function for probabilistic distributions, the smaller the memory consumed for the tiering. This would ultimately result in an auto-tiering of the data streams.

Still referring to FIG. 1, storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic or agent 121 is configured to receive and back up or replicate data from a client (e.g., clients 101-102) and to store the backup data in any one or more of storage units 108-109. Restore logic or agent 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks), for example as data objects 112-113, according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 2:
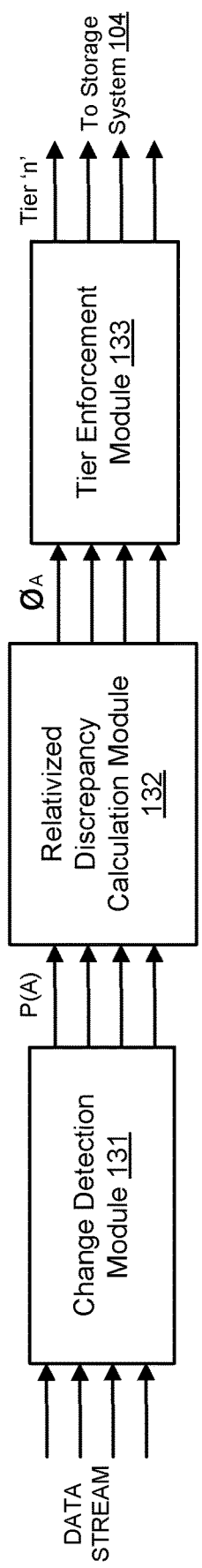
FIG. 2 is a schematic diagram illustrating an auto-tiering of data streams according to one embodiment.

FIG. 2 is a schematic diagram illustrating an auto-tiering of data streams according to one embodiment. Referring to FIG. 2, change detection module 131 may receive backup data from different sets of data streams. In one embodiment, module 131 may include a meta-algorithm that runs in parallel at a time for the different sets of data streams. For example, consider a data stream (referred to as DataStream S) to be a sequence that arises from a non-static distribution source (e.g., clients 101-102 that host a backup service). The non-static distribution source may be an application, a file system, or a virtual machine. In the meta-algorithm, consider $S=\{s_1, s_2, s_3, \ldots, s_i\}$ to be a sequence, where each item $s_i$ is generated from the items generated by a probabilistic distribution, $P_i$. In one embodiment, the algorithm begins with using a sliding window X which is static on the data at a point where the last data change was detected, and another sliding window Y which slides one step forward every time there is new data at the stream level. The pseudo algorithm is shown in FIG. 3.

FIG. 3 is a diagram showing pseudo-code of a sliding window algorithm accordingly to one embodiment. As shown, the meta-algorithm runs 'k' independent times, in parallel, each for triplet $(m_{1,i}, m_{2,i}, \alpha_i)$. For each of the sets of the data streams, the second window slides and after a data change has been detected, the first window slides next step. If $P_i \neq P_{i+1}$, and the distance function $d(X,Y) > \alpha_i$ then a change of data is detected. Here, the distance function can be any function, for example Hamming's, K-means, k-nearest neighbors (KNN), etc. In one embodiment, parameter $\alpha_i$ (which may be a predetermined value) may be '1' by default. This is usually the most probable occurrence that can occur within a defined schedule. In one embodiment, parameter $\alpha_i$ may be user-tunable in accordance with the user's choice. In on embodiment, parameter $\alpha_i$ may be adjusted from the probabilistic distributions that occur eventually and identified by the system. With the meta-algorithm of module 131, only a change is detected, and a mechanism is needed to detect the magnitude of that change in a numerical form.

Referring back to FIG. 2, relativized discrepancy calculation module 132 may receive the probability distributions from change detection module 131 in order to analyze the magnitude of data changes. For example, module 132 may assume the probabilistic distributions are an infinite but positive set of items, and thus, the bounded set must have a supremum. For the considered data streams, the supremum can be calculated as follows:

Let $P_1$ and $P_2$ be two distinct probabilistic distributions from the change detection that occurs from the same measure space (e.g., the same host data source). Then, a finite supremum may be evaluated and denoted as, $\emptyset_A(P_1, P_2)$, where a subset A considered from the data streams is a part of a super set 'F'. Thus, the supremum can be given as:

$$\sup_{A \in F} \left( \frac{|P_1(A) - P_2(A)|}{\min\left\{\frac{P_1(A) + P_2(A)}{2}, \left(1 - \frac{P_1(A) + P_2(A)}{2}\right)\right\}} \right)$$

From the above equation, the supremum can be evaluated for the probabilistic distributions from the two sliding windows. These values may be routed to tier enforcement module 133 for auto-tiering.

Still referring to FIG. 2 and also referring to FIG. 4, which is a table illustrating an example of data tier classification according to one embodiment, tier enforcement module 133 may evaluate the supremum values (i.e., magnitude of data changes), as provided by relativized discrepancy calculation module 132. For example, as shown in table 400 (e.g., a lookup table), any value that is between 0 and $0.5\alpha_i$, the tiering of the data stream may be classified as a lowest tier level since the magnitude is between 0 and 0.5 times $\alpha_i$. With the lowest tier level, limited or minimum bandwidth and storage are provided, for example by storage system 104 of FIG. 1. If the values are greater than $0.5\alpha_i$ but less than $0.75\alpha_i$, then the tiering may be classified as a medium tier level with optimum bandwidth and storage provided. For any values greater than $0.75\alpha_i$, the tiering may be classified as a highest tier level with maximum bandwidth and storage provided.

Figure 5:
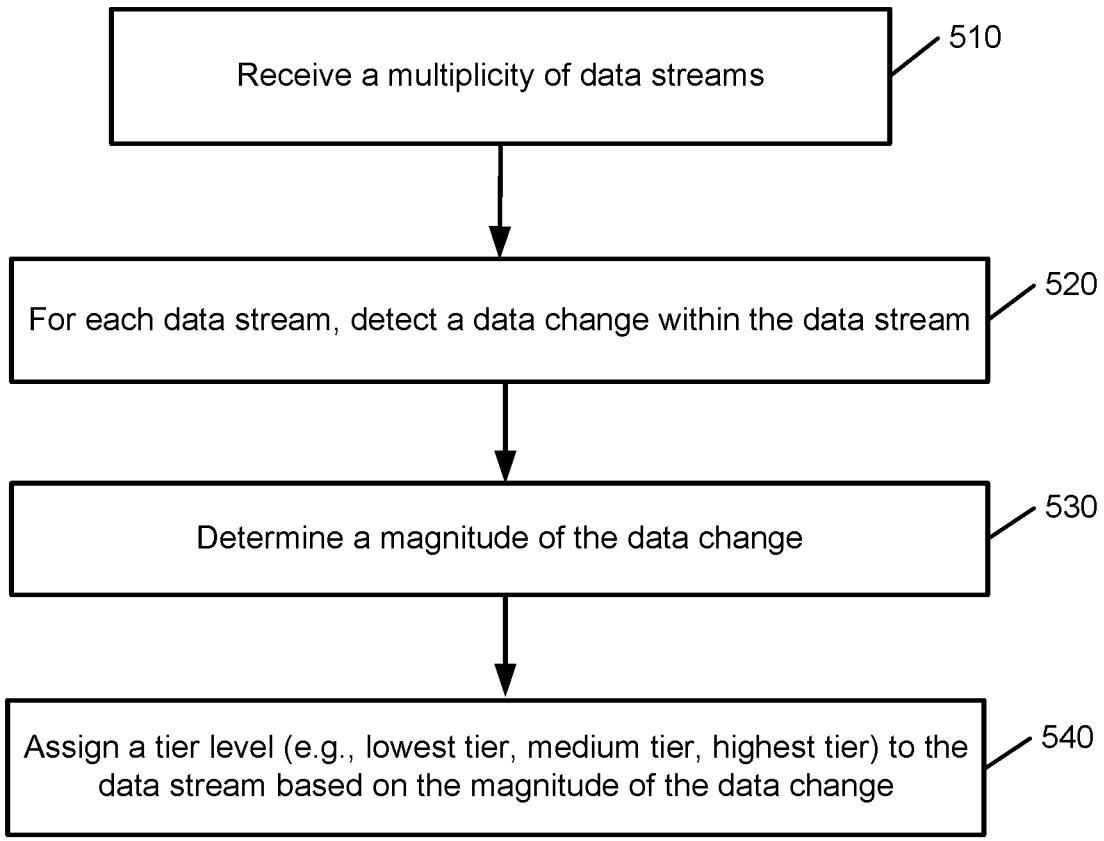
FIG. 5 is a flow diagram illustrating a method for data auto-tiering according to one embodiment.

FIG. 5 is a flow diagram illustrating a method for data auto-tiering according to one embodiment. Process 500 may be performed by processing logic that includes hardware (e.g. circuitry, dedicated logic, etc.), software (e.g., embodied on a non-transitory computer readable medium), or a combination thereof. For example, process 500 may be performed by change detection module 131, relativized discrepancy calculation module 132 and/or tier enforcement module 133 of FIG. 1.

Referring to FIG. 5, at block 510, the processing logic receives a multiplicity of data streams (e.g., backup data). At block 520, for each data stream, the processing logic detects a data change within the data stream. At block 530, the processing logic determines a magnitude of the data change. At block 540, the processing logic assigns a tier level (e.g., lowest tier, medium tier, highest tier) to the data stream based on the magnitude of the data change.

Note that some or all of the components as shown and described above (e.g., change detection module 131, relativized discrepancy calculation module 132, and tier enforcement module 133 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
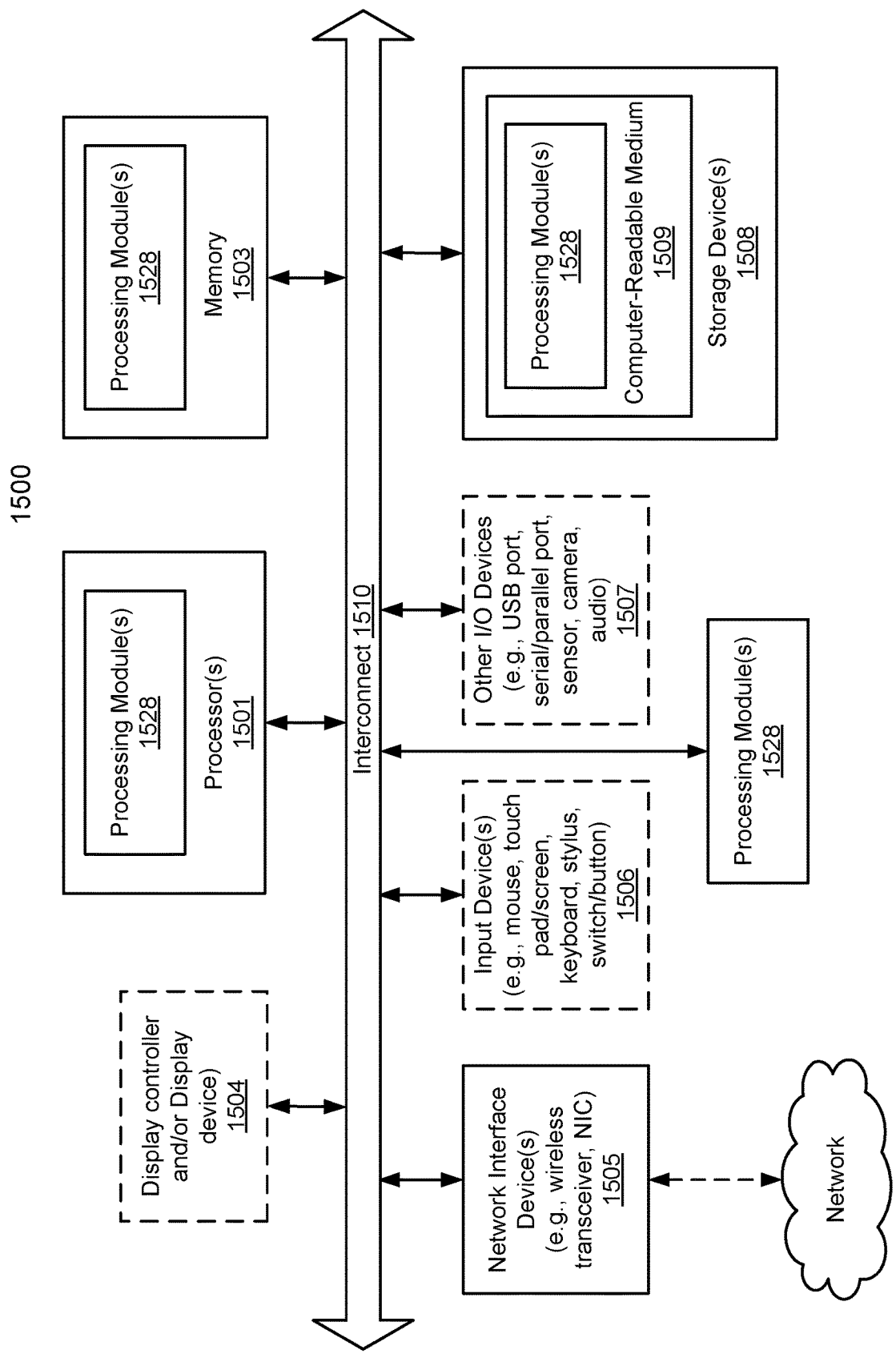
FIG. 6 is a block diagram illustrating a data processing system according to one embodiment.

FIG. 6 is a block diagram illustrating an example of a data processing system which may be used with one embodiment. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, modules 131-133 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of data auto-tiering, comprising:
   receiving a plurality of data streams; and
   for each data stream,
      detecting a data change within the data stream,
      determining a magnitude of the data change, and
      assigning a tier level to the data stream based on the magnitude of the data change.

2. The method of claim 1, wherein detecting the data change within the data stream comprises:
   using a first sliding window on a data point where a last data change was detected, and
   using a second sliding window that slides a step forward every time there is new data in the data stream.

3. The method of claim 2, wherein determining the magnitude of the data change comprises: evaluating a supremum based on a first probabilistic distribution associated with the first sliding window and a second probabilistic distribution associated with the second sliding window.

4. The method of claim 1, wherein the assigned tier level is a lowest tier level representing minimum bandwidth and storage, a medium tier level representing optimum bandwidth and storage, or a highest tier level representing maximum bandwidth and storage.

5. The method of claim 1, wherein the magnitude of the data change is a factor of a predetermined value.

6. The method of claim 5, wherein the factor is between 0 and 0.5, greater than 0.5 but less than 0.75, or greater than 0.75.

7. The method of claim 6, wherein the predetermined value is 1.

8. The method of claim 1, wherein the detection of the data change, the determination of the magnitude of the data change, and the assignment of the tier level to the data stream are run in parallel for each of the data streams.

9. A non-transitory machine-readable medium having instructions stored therein, which when executed by a processor, cause the processor to perform operations, the operations comprising:
  receiving a plurality of data streams; and
  for each data stream,
    detecting a data change within the data stream,
    determining a magnitude of the data change, and
    assigning a tier level to the data stream based on the magnitude of the data change.

10. The non-transitory machine-readable medium of claim 9, wherein detecting the data change within the data stream comprises:
  using a first sliding window on a data point where a last data change was detected, and
  using a second sliding window that slides a step forward every time there is new data in the data stream.

11. The non-transitory machine-readable medium of claim 10, wherein determining the magnitude of the data change comprises: evaluating a supremum based on a first probabilistic distribution associated with the first sliding window and a second probabilistic distribution associated with the second sliding window.

12. The non-transitory machine-readable medium of claim 9, wherein the assigned tier level is a lowest tier level representing minimum bandwidth and storage, a medium tier level representing optimum bandwidth and storage, or a highest tier level representing maximum bandwidth and storage.

13. The non-transitory machine-readable medium of claim 9, wherein the magnitude of the data change is a factor of a predetermined value.

14. The non-transitory machine-readable medium of claim 13, wherein the factor is between 0 and 0.5, greater than 0.5 but less than 0.75, or greater than 0.75.

15. The non-transitory machine-readable medium of claim 14, wherein the predetermined value is 1.

16. The non-transitory machine-readable medium of claim 9, wherein the detection of the data change, the determination of the magnitude of the data change, and the assignment of the tier level to the data stream are run in parallel for each of the data streams.

17. A data processing system, comprising:
  a processor; and
  a memory coupled to the processor to store instructions, which when executed by the processor, cause the processor to perform operations, the operations comprising:
  receiving a plurality of data streams; and
  for each data stream,
    detecting a data change within the data stream,
    determining a magnitude of the data change, and
    assigning a tier level to the data stream based on the magnitude of the data change.

18. The data processing system of claim 17, wherein detecting the data change within the data stream comprises:
  using a first sliding window on a data point where a last data change was detected, and
  using a second sliding window that slides a step forward every time there is new data in the data stream.

19. The data processing system of claim 18, wherein determining the magnitude of the data change comprises: evaluating a supremum based on a first probabilistic distribution associated with the first sliding window and a second probabilistic distribution associated with the second sliding window.

20. The data processing system of claim 17, wherein the assigned tier level is a lowest tier level representing minimum bandwidth and storage, a medium tier level representing optimum bandwidth and storage, or a highest tier level representing maximum bandwidth and storage.

* * * * *